US012784935B2

(12) United States Patent
Tanaka et al.

(10) Patent No.: US 12,784,935 B2
(45) Date of Patent: Nov. 3, 2026

(54) MULTICORE CABLE

(71) Applicant: Sumitomo Electric Industries, Ltd., Osaka (JP)

(72) Inventors: Shigeyuki Tanaka, Osaka (JP); Yutaka Matsumura, Osaka (JP); Taro Fujita, Osaka (JP); Takumi Ooshima, Kanuma (JP); Hirotaka Kato, Kanuma (JP); Jo Yagisawa, Kanuma (JP); Shinya Nishikawa, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 201 days.

(21) Appl. No.: 18/726,501

(22) PCT Filed: Oct. 5, 2022

(86) PCT No.: PCT/JP2022/037261
§ 371 (c)(1),
(2) Date: Jul. 3, 2024

(87) PCT Pub. No.: WO2023/132111
PCT Pub. Date: Jul. 13, 2023

(65) Prior Publication Data

US 2025/0069774 A1 Feb. 27, 2025

(30) Foreign Application Priority Data

Jan. 5, 2022 (JP) ................................ 2022-000760

(51) Int. Cl.
*H01B 7/02* (2006.01)
*C08L 23/0869* (2025.01)
(Continued)

(52) U.S. Cl.
CPC ........ *H01B 7/0216* (2013.01); *C08L 23/0869* (2013.01); *C08L 75/04* (2013.01);
(Continued)

(58) Field of Classification Search
CPC ............................ H01B 7/0216; H01B 7/1875
(Continued)

(56) References Cited

U.S. PATENT DOCUMENTS

2017/0309370 A1 10/2017 Tanaka et al.
2017/0309373 A1* 10/2017 Tanaka ..................... H01B 7/30
(Continued)

FOREIGN PATENT DOCUMENTS

JP 2017-027878 A 2/2017
JP 2018-032515 A 3/2018
(Continued)

*Primary Examiner* — Chau N Nguyen
(74) *Attorney, Agent, or Firm* — Volpe Koenig

(57) ABSTRACT

A multicore cable according to one embodiment of the present disclosure includes a core wire including a plurality of core electric wires stranded together; and a sheath layer disposed around the core wire, wherein each of the core wires includes a conductor including a plurality of elemental wires twisted together and an insulating layer that covers an outer periphery of the conductor, wherein the sheath layer includes an inner sheath layer and an outer sheath layer covering the inner sheath layer, wherein a main component of the inner sheath layer is a copolymer of ethylene and (meth)acrylic acid alkyl ester, and wherein a content of the (meth)acrylic acid alkyl ester in the copolymer is more than 7 mass %.

6 Claims, 3 Drawing Sheets

(51) Int. Cl.

| | |
|---|---|
| ***C08L 75/04*** | (2006.01) |
| ***H01B 3/44*** | (2006.01) |
| *H01B 3/30* | (2006.01) |

(52) U.S. Cl.
CPC .......... *H01B 3/44* (2013.01); *C08L 2203/202* (2013.01); *H01B 3/302* (2013.01)

(58) Field of Classification Search
USPC ...................................................... 174/120 R
See application file for complete search history.

(56) References Cited

U.S. PATENT DOCUMENTS

| | | | | |
|---|---|---|---|---|
| 2018/0182511 | A1* | 6/2018 | Tanaka ................... | H01B 3/307 |
| 2021/0319929 | A1 | 10/2021 | Matsumura et al. | |
| 2022/0310286 | A1 | 9/2022 | Hori | |

FOREIGN PATENT DOCUMENTS

| | | | |
|---|---|---|---|
| WO | 2017/056279 | A1 | 4/2017 |
| WO | 2020/044850 | A1 | 3/2020 |
| WO | 2021/039576 | A1 | 3/2021 |

* cited by examiner

MULTICORE CABLE

TECHNICAL FIELD

The present disclosure relates to a multicore cable. This application claims priority from Japanese Patent Application No. 2022-000760 filed on Jan. 5, 2022, the entire contents of which are incorporated herein by reference.

BACKGROUND ART

Patent literature 1 describes, as a core electric wire used for an in-vehicle multicore cable for electronic parking brake (EPB), a wheel speed sensor, or the like, a core electric wire having a conductor and two insulating layers made of a resin and coating the conductor, with one insulating layer including a copolymer of ethylene and an α-olefin having a carbonyl group, and the other insulating layer including polyolefin or fluororesin.

Citation List

Patent Literature

Patent literature 1: Japanese Unexamined Patent Application Publication No. 2018-032515

SUMMARY OF INVENTION

A multicore cable in one aspect of the present disclosure includes a core wire including a plurality of core electric wires stranded together, and a sheath layer disposed around the core wire. Each of the core electric wires includes a conductor including a plurality of elemental wires twisted together and an insulating layer covering an outer periphery of the conductor. The sheath layer includes an inner sheath layer and an outer sheath layer covering the inner sheath layer. A main component of the inner sheath layer is a copolymer of ethylene and (meth)acrylic acid alkyl ester. A content of the (meth)acrylic acid alkyl ester in the copolymer is more than 7 mass %.

DETAILED DESCRIPTION

Figure 1:
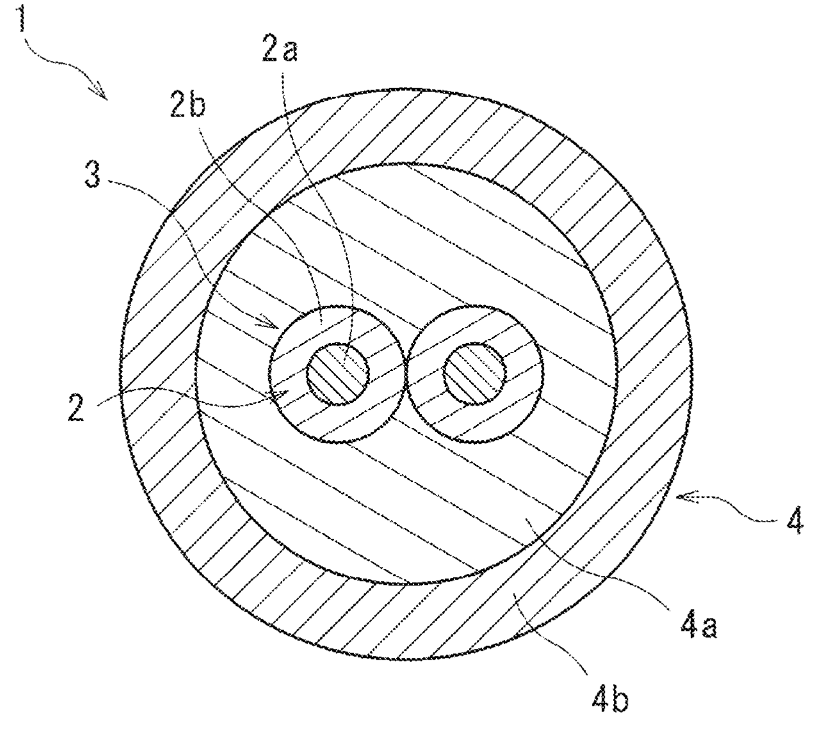
FIG. 1 is a schematic cross section of a multicore cable according to an embodiment of the present disclosure.

Problems to be Solved by Present Disclosure

Since an in-vehicle multicore cable for an electronic parking brake, a wheel speed sensor, or the like, is complicatedly bent as it is routed in a vehicle, an actuator is driven and/or the like, the in-vehicle multicore cable is required to have excellent bending durability and wiring workability.

The present disclosure has been provided under such circumstances, and contemplates a multicore cable that is excellent in bending durability and wiring workability.

Advantageous Effect of the Present Disclosure

A multicore cable in one aspect of the present disclosure is excellent in bending durability and wiring workability.

DESCRIPTION OF EMBODIMENTS

First, embodiments of the present disclosure will be specified and described.

A multicore cable in one aspect of the present disclosure includes a core wire including a plurality of core electric wires stranded together, and a sheath layer disposed around the core wire. Each of the core electric wires includes a conductor including a plurality of elemental wires twisted together and an insulating layer covering an outer periphery of the conductor. The sheath layer includes an inner sheath layer and an outer sheath layer covering the inner sheath layer. A main component of the inner sheath layer is a copolymer of ethylene and (meth)acrylic acid alkyl ester. A content of the (meth)acrylic acid alkyl ester in the copolymer is more than 7 mass %.

The multicore cable is excellent in bending durability and wiring workability by using a specific material as a main component of the inner sheath layer. "Bending durability" means the ability of a conductor not to break even when an electric wire or a cable is repeatedly bent. In addition, the multicore cable is excellent in bending durability at low temperature. "Low temperature" means a range in temperature of 0° C. or lower.

The (meth)acrylic acid alkyl ester is preferably ethyl acrylate. In this case, an elastic modulus at low temperature can be reduced, and bending durability at low temperature can be improved.

The content of the (meth)acrylic acid alkyl ester in the copolymer is preferably 10 mass % or more. In this case, bending durability of the multicore cable can be further improved.

A main component of the outer sheath layer is preferably polyurethane. In this case, bending durability can be further improved.

A linear expansion coefficient C of the inner sheath layer at −30° C. to 25° C. is preferably $0.8\times10^{-4}K^{-1}$ to $1.5\times10^{-4}K^{-1}$. In this case, bending durability can be further improved.

An elastic modulus E1 of the inner sheath layer at −30° C. is preferably 400 MPa to 1,300 MPa. In this case, bending durability can be further improved.

The multicore cable is suitably used as an in-vehicle cable.

DETAILED DESCRIPTION OF EMBODIMENTS

Hereinafter, a multicore cable according to an embodiment of the present disclosure will be described in detail with reference to the drawings.

<Multicore Cable>

A multicore cable 1 shown in FIG. 1 includes a core wire 3 including a plurality of core electric wires 2 twisted together, and a sheath layer 4 disposed around core wire 3. Multicore cable 1 can be suitably used as an in-vehicle cable. Specific applications include, for example, an electronic parking brake (EPB), a wheel speed sensor, and an in-wheel motor.

Multicore cable 1 is not particularly limited in shape in lateral cross section, and it for example has a round cross section. Multicore cable 1 has the average outer diameter designed, as appropriate, depending on the application, with a lower limit of, for example, 6 mm, and preferably 8 mm, and an upper limit of, for example, 16 mm, and preferably 12 mm. "Average outer diameter" means an average value of outer diameters at any ten lateral cross sections. For example, when the lateral cross section is flat and the measured value varies depending on the way of measuring the diameter, the average value of the maximum outer diameter and the minimum outer diameter is regarded as the outer diameter. In the description of an upper limit and a lower limit of the numerical range in the present specification, "or less" or "less than" may mean "upper limit", and "or more" or "more than" may mean "lower limit", unless otherwise specified.

[Core Wire]

Core wire 3 is a bunched stranded wire including the plurality of core electric wires 2 twisted together.

(Core Electric Wire)

Core electric wire 2 includes a conductor 2*a* including a plurality of elemental wires twisted together and an insulating layer 2*b* covering an outer periphery of conductor 2*a*.

Core electric wire 2 has an average outer diameter d with a lower limit of, for example, 1.3 mm and preferably 2.0 mm, and with an upper limit of, for example, 5.0 mm and preferably 4.5 mm.

Conductor 2*a* is formed by twisting a plurality of elemental wires at a fixed pitch. The elemental wire is not particularly limited, and examples thereof include a copper wire, a copper alloy wire, an aluminum wire, and an aluminum alloy wire. Further, conductor 2*a* is preferably such that a plurality of elemental wires are twisted together to form a strand and a plurality of such strands are further stranded together to form a stranded wire to serve as conductor 2*a*. The strands to be stranded together are preferably each formed of the same number of elemental wires twisted together.

The elemental wire preferably has an average diameter with a lower limit preferably of 40 μm, more preferably 50 μm, and still more preferably 60 μm. On the other hand, the elemental wire preferably has the average diameter with an upper limit preferably of 100 μm, and more preferably 90 μm. The average diameter of the elemental wire refers to an average value obtained when the elemental wire is measured at any three points with a micrometer having cylindrical opposite ends to obtain an average diameter therefrom.

The number of elemental wires is suitably designed in accordance with the application of multicore cable 1, the diameter of the elemental wire, and the like, and the lower limit therefor is preferably 196 wires and more preferably 294 wires. On the other hand, the upper limit for the number of elemental wires is preferably 2450 wires and more preferably 2000 wires. Examples of the stranded wire include: a stranded wire composed of 196 elemental wires forming 7 strands each formed of 28 elemental wires twisted together; a stranded wire composed of 294 elemental wires forming 7 strands each formed of 42 elemental wires twisted together; a stranded wire composed of 380 elemental wires forming 19 strands each formed of 20 elemental wires twisted together; a stranded wire composed of 1568 elemental wires forming seven strands each formed of 224 elemental wires forming seven strands each formed of 32 elemental wires twisted together; a stranded wire composed of 2450 elemental wires forming seven strands each formed of 350 elemental wires forming seven strands each formed of 50 elemental wires twisted together; and the like.

Conductor 2*a* has an average lateral cross-sectional area (including a gap between elemental wires) with a lower limit preferably of 1.0 $mm^2$, more preferably 1.5 $mm^2$, still more preferably 1.8 $mm^2$ and still more preferably 2.0 $mm^2$. On the other hand, conductors 2*a* has the average lateral cross-sectional area with an upper limit preferably of 3.0 $mm^2$ and more preferably 2.8 $mm^2$. As a method for calculating the average lateral cross-sectional area of conductor 2*a*, conductor 2*a* is measured in outer diameter at any three points with a caliper without squashing the conductor's stranded structure to thus obtain an average value of the three points and define it as an average outer diameter, and an area calculated from the average outer diameter is defined as the conductor's average area.

Insulating layer 2*b* is formed of an insulating layer-forming composition containing a synthetic resin as a main component, and is disposed on the outer periphery of conductor 2*a* to cover conductor 2*a*. "Main component" means a substance having the highest content among substances constituting insulating layer 2*b*. Insulating layer 2*b* is not particularly limited in average thickness, it is, for example, 0.1 mm to 5 mm. "Average thickness" means an average value in thickness as measured at any ten points.

The synthetic resin as the main component of insulating layer 2*b* may be crosslinked by electron beam radiation or the like. As described above, since the main component of insulating layer 2*b* is a crosslinked synthetic resin, it is possible to control deformation of insulating layer 2*b* due to heat when sheath layer 4 is formed by extrusion molding in the manufacture of multicore cable 1. The crosslinking can be carried out by exposing the insulating layer-forming composition to ionizing radiation. Examples of ionizing radiation include a γ-ray, an electron beam, an X-ray, a neutron beam, and a high-energy ion beam. Exposure to ionizing radiation is performed at a dose with a lower limit preferably of 10 kGy and more preferably 30 kGy. On the other hand, exposure to ionizing radiation is performed at the dose with an upper limit preferably of 300 kGy and more preferably 240 kGy.

Examples of the synthetic resin include polyvinyl chloride, polyolefin-based resins, and polyurethane resins. Examples of the polyolefin-based resin include polypropylene (homopolymer, block polymer, random polymer, etc.), polypropylene-based thermoplastic elastomer, reactor type polypropylene-based thermoplastic elastomer, dynamic crosslinking type polypropylene-based thermoplastic elastomer, polyethylene (high-density polyethylene, linear low-density polyethylene, low-density polyethylene, very-low-density polyethylene, etc.), ethylene-vinyl acetate copolymer, ethylene-ethyl acrylate copolymer, ethylene-methyl methacrylate copolymer, ethylene-methyl acrylate copolymer, ethylene-ethyl acrylate copolymer, ethylene-butyl acrylate copolymer, ethylene-propylene rubber, ethylene acrylic rubber, ethylene-glycidyl meth acrylate copolymer, ethylene-meth acrylic acid copolymer, and other polyethylene-based resins. As the polyolefin-based resin, an ionomer resin obtained by bonding molecules of a copolymer such as ethylene-methacrylic acid copolymer or ethylene-acrylic acid copolymer with a metal ion such as sodium or zinc can also be used. Further, these resins may be modified with maleic anhydride or the like. Further, these resins may have an epoxy group, an amino group, an imide group, or the like.

Insulating layer 2*b* has a product of the linear expansion coefficient C for the range of −35° C. to 25° C. and the elastic modulus E at −35° C., i.e., C×E, with a lower limit of preferably 0.01 $MPaK^{-1}$. On the other hand, insulating layer 2*b* has product C×E with an upper limit of preferably 0.9 $MPaK^{-1}$. Note that product C×E can be adjusted by the type and the content ratio of synthetic resin, the presence or absence of additives, and the like.

Insulating layer 2*b* has the linear expansion coefficient C with a lower limit preferably of $1.0\times10^{-5}K^{-1}$ and more preferably $1.0\times10^{-4}K^{-1}$ for −35° C. to 25° C. On the other hand, insulating layer 2*b* has the linear expansion coefficient C with an upper limit preferably of $2.5\times10^{-4}K^{-1}$ and more preferably $2.0\times10^{-4}K^{-1}$. "Linear expansion coefficient" as referred to herein is a value calculated from a dimensional change of a thin plate with respect to variation in temperature pursuant to a method for determining dynamic mechanical properties, as specified in JIS-K7244-4 (1999), using a dynamic viscoelasticity analyzer ("DVA-220" of IT keisoku seigyo K.K.) in a tensile mode in a range in temperature of −100° C. to 200° C. with a temperature increasing rate of 5° C./minute at a frequency of 10 Hz with a strain of 0.05%.

Insulating layer 2*b* has the elastic modulus E with a lower limit preferably of 1,000 MPa and more preferably 2,000 MPa at −35° C. On the other hand, insulating layer 2*b* has the elastic modulus E with an upper limit preferably of 3,500 MPa and more preferably 3,000 MPa. "Elastic modulus" means a value of a storage modulus measured pursuant to a method for determining dynamic mechanical properties, as specified in JIS-K7244-4 (1999), using a dynamic viscoelasticity analyzer in a tensile mode in a range in temperature of −100° C. to 200° C. with a temperature increasing rate of 5° C./minute at a frequency of 10 Hz with a strain of 0.05%.

Insulating layer 2*b* may contain additives such as a flame retardant, a flame retardant aid, an antioxidant, a lubricant, a colorant, a reflection imparting agent, a concealer, a processing stabilizer, and a plasticizer, if necessary. Examples of the flame retardant include halogen-based flame retardants such as a bromine-based flame retardant and a chlorine-based flame retardant, and non-halogen-based flame retardants such as metal hydroxide, a nitrogen-based flame retardant and a phosphorus-based flame retardant. The flame retardant may be of one type alone or two or more types in combination.

[Sheath Layer]

Sheath layer 4 has a two-layer structure including an inner sheath layer 4*a* disposed on an external side of core wire 3 and an outer sheath layer 4*b* disposed on the outer periphery of inner sheath layer 4*a*.

The main component of inner sheath layer 4*a* is a copolymer of ethylene and (meth)acrylic acid alkyl ester (hereinafter, also referred to as "ethylene-(meth)acrylic acid alkyl ester copolymer"). The expression "(meth)acrylic acid" is a concept encompassing both acrylic acid and methacrylic acid. Multicore cable 1 exhibits excellent bending durability and wiring workability and can achieve both bending durability and wiring workability by using an ethylene-(meth) acrylic acid alkyl ester copolymer as the main component of inner sheath layer 4*a* and further adjusting the content of (meth)acrylic acid alkyl ester described later.

Examples of the (meth)acrylic acid alkyl ester include alkyl esters of (meth)acrylic acid having 1 to 15 carbon atoms. Specific examples thereof include methyl (meth) acrylate, ethyl (meth)acrylate, n-propyl (meth)acrylate, i-propyl (meth)acrylate, n-butyl (meth)acrylate, i-butyl (meth)acrylate, t-butyl (meth)acrylate, and 2-ethylhexyl (meth)acrylate. Among these, alkyl esters of (meth)acrylic acid having 1 to 10 carbon atoms are preferable, ethyl (meth)acrylate is more preferable, and ethyl acrylate is still more preferable. In this case, the elastic modulus at low temperature can be reduced, and bending durability at low temperature can be improved.

The content of the (meth)acrylic acid alkyl ester in the ethylene-(meth)acrylic acid alkyl ester copolymer is more than 7 mass %. Multicore cable 1 exhibits excellent bending durability when the content of the (meth)acrylic acid alkyl ester is within the above specified range. The content of the (meth)acrylic acid alkyl ester in the ethylene-(meth)acrylic acid alkyl ester copolymer means the content of the repeating unit derived from (meth)acrylic acid alkyl ester with respect to the total repeating units constituting the ethylene-(meth)acrylic acid alkyl ester copolymer.

The lower limit of the content of the (meth)acrylic acid alkyl ester in the ethylene-(meth)acrylic acid alkyl ester copolymer is preferably 8 mass %, more preferably 10 mass %, still more preferably 12 mass % and yet still more preferably 15 mass %. In this case, bending durability of multicore cable 1 can be further improved, and both bending durability and wiring workability can be achieved at a high level. Further, when the main component of outer sheath layer 4*b* is polyurethane, the adhesion between inner sheath layer 4*a* and outer sheath layer 4*b* can be improved.

The upper limit of the content of the (meth)acrylic acid alkyl ester in the ethylene-(meth)acrylic acid alkyl ester copolymer is preferably 30 mass %, more preferably 28 mass %, still more preferably 26 mass % and yet still more preferably 25 mass %.

Inner sheath layer 4*a* has the linear expansion coefficient C with a lower limit preferably of $0.8\times10^{-4}K^{-1}$ and more preferably $1.0\times10^{-4}K^{-1}$ for −30° C. to 25° C. On the other hand, inner sheath layer 4*a* has the linear expansion coefficient C with an upper limit preferably of $1.5\times10^{-4}K^{-1}$, and more preferably $1.4\times10^{-4}K^{-1}$. In this case, bending durability can be further improved.

Inner sheath layer 4*a* has the elastic modulus E1 with a lower limit preferably of 300 MPa and more preferably 400 MPa at −30° C. On the other hand, inner sheath layer 4*a* has the elastic modulus E1 with an upper limit preferably of 1,300 MPa and more preferably 1,000 MPa.

Inner sheath layer 4*a* has an elastic modulus E2 with a lower limit preferably of 10 MPa and more preferably 30 MPa at 25° C. On the other hand, inner sheath layer 4*a* has the elastic modulus E2 with an upper limit preferably of 200 MPa and more preferably 150 MPa.

Inner sheath layer 4*a* has a minimum thickness (i.e., a minimum distance between core wire 3 and the outer periphery of inner sheath layer 4*a*) with a lower limit preferably of 0.3 mm and more preferably 0.4 mm. On the other hand, inner sheath layer 4*a* has the minimum thickness with an upper limit preferably of 0.9 mm and more preferably 0.8 mm.

Outer sheath layer 4*b* is not particularly limited in what it has as its main component insofar as it is a synthetic resin excellent in flame retardancy and abrasion resistance, and it may be polyurethane and crosslinked polyethylene, for example. When polyurethane is used, bending durability of multicore cable 1 can be further improved. In addition, the adhesion between inner sheath layer 4*a* and outer sheath layer 4*b* can be also improved.

Outer sheath layer 4*b* has an average thickness preferably of 0.3 mm to 0.7 mm.

Inner sheath layer 4*a* and outer sheath layer 4*b* each preferably have a resin component crosslinked. How inner sheath layer 4*a* and outer sheath layer 4*b* are crosslinked can be the same as how insulating layer 2*b* is crosslinked.

Inner sheath layer 4*a* and outer sheath layer 4*b* may contain an additive indicated above for insulating layer 2*b* by way of example.

A tape member such as paper or nonwoven fabric may be wound between core wire 3 and sheath layer 4 as a member to restrain winding.

<Method for Manufacturing Multicore Cable>

Multicore cable 1 can be obtained in a manufacturing method including the steps of: stranding the plurality of core electric wires 2 together (a stranding step); and covering with sheath layer 4 an external side of core wire 3 composed of the plurality of core electric wires 2 stranded together (a step of coating with a sheath layer).

Figure 2:
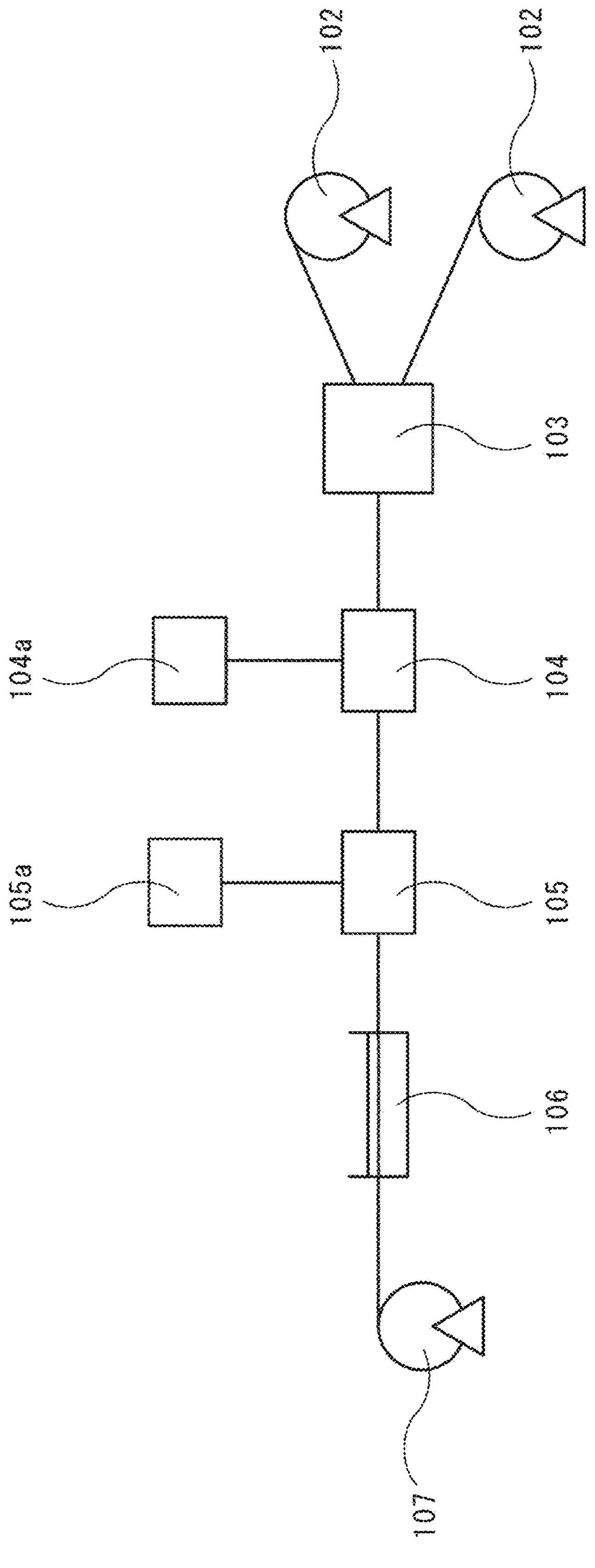
FIG. 2 is a schematic diagram showing a multicore cable manufacturing apparatus according to an embodiment of the present disclosure.

The above method for manufacturing the multicore cable can be performed by using, for example, a multicore cable manufacturing apparatus shown in FIG. 2. The multicore cable manufacturing apparatus mainly includes a plurality of supplying reels 102, a stranding unit 103, a unit 104 which provides an inner sheath layer for coating, a unit 105 which provides an outer sheath layer for coating, a cooling unit 106, and a cable winding reel 107.

(Stranding Step)

In the stranding step, the plurality of core electric wires 2 that are wound on the plurality of supplying reels 102 are supplied to stranding unit 103, which twisted core electric wires 2 together to form core wire 3.

(Step of Coating with a Sheath Layer)

In the step of coating with a sheath layer, unit 104 that provides an inner sheath layer for coating extrudes on an external side of core wire 3 formed by stranding unit 103 a composition reserved in a reservoir 104*a* for forming the inner sheath layer 4*a*.

After coating with inner sheath layer 4*a*, unit 105 that provides an outer sheath layer for coating extrudes on an outer periphery of inner sheath layer 4*a* a resin composition reserved in a reservoir 105*a*. Thus, inner sheath layer 4*a* has the outer periphery coated with outer sheath layer 4*b*.

After coating with outer sheath layer 4*b*, core wire 3 is cooled by cooling unit 106 to set sheath layer 4, and multicore cable 1 is thus obtained. Multicore cable 1 is wound by cable winding reel 107 and thus collected.

It is recommendable that the method for manufacturing the multicore cable further comprise the step of crosslinking a resin component of sheath layer 4 (a crosslinking step). This crosslinking step may be performed before coating core wire 3 with the composition that forms sheath layer 4, or may be performed thereafter (i.e., after sheath layer 4 is formed).

The crosslinking step can be performed by exposing the insulating layer-forming composition to ionizing radiation, as has been done for insulating layer 2*b* of multicore cable 1.

OTHER EMBODIMENTS

It should be understood that the embodiments disclosed herein have been described for the purpose of illustration only and in a non-restrictive manner in any respect. The scope of the present disclosure is defined by the terms of the claims, rather than the configurations of the above embodiments, and is intended to include any modifications within the meaning and scope equivalent to the terms of the claim Multicore cable 1 may include another layer between core wire 3 and sheath layer 4 or in the outer periphery of sheath layer 4. Examples of the other layer disposed between core wire 3 and sheath layer 4 include a member layer to restrain winding such as a paper tape layer and a nonwoven fabric layer. Further, examples of another layer disposed in the outer periphery of sheath layer 4 include a shield layer.

Example

Hereinafter, the present disclosure will be described in more detail with reference to examples, although the present invention is not limited to thereto these examples.

[Preparation of Core Electric Wire]

An insulating layer-forming composition was prepared by blending 100 parts by mass of ethylene-ethyl acrylate copolymer, 70 parts by mass of flame retardant, and 2 parts by mass of antioxidant. As the conductor, a strand was formed by twisting 72 elemental wires of annealed copper having an average diameter of 80 μm, and further, a stranded wire obtained by stranding 7 of the strands was used. Then, the insulating layer-forming composition was extruded to the outer periphery of the conductor to form an insulating layer, thereby obtaining a core electric wire having an average outer diameter of 3.0 mm. The insulating layer was exposed to an electron beam at 60 kGy to crosslink a resin component. The ethylene-ethyl acrylate copolymer used for preparing insulating layer-forming composition was "DPDJ-6182" (ethyl acrylate content 15 mass %) of ENEOS NUC Corporation, the flame retardant was aluminum hydroxide ("Hijilite (registered trade name) H-31" of Showa Denko Co., Ltd.), and the anti-oxidant was "Irganox (registered trade name) 1010" of BASF Japan Ltd.

[Preparation of Multicore Cable]

An inner sheath layer-forming composition was prepared by mixing 100 parts by mass of a resin component and 1 part by mass of an antioxidant ("Irganox 1010" of BASF Japan Ltd.) shown in the row of "inner sheath layer" of the following Table 1. In addition, an outer sheath layer-forming composition was prepared by mixing 100 parts by mass of polyurethane ("Elastollan ET385-50" of BASF Japan Ltd.), 5 parts by mass of a crosslinking aid ("TD1500s" of DIC Corporation), and 2 parts by mass of carbon black ("Seast 3H" of TOKAI CARBON CO., LTD.). Two core electric wires produced as described above were twisted together to form a core wire. Next, the inner sheath layer-forming composition and the outer sheath layer-forming composition were sequentially extruded around the core wire so that the inner sheath layer-forming composition was on the inner side (core side) to form a sheath layer, and thus, multicore cables Nos. 1 to 8 having an average outer diameter of 8.3 mm were obtained. The sheath layer was exposed to an electron beam at 180 kGy to crosslink a resin component.

The materials used as the resin component of the inner sheath layer described in Table 1 below are as follows. The ethyl acrylate content of the ethylene-ethyl acrylate copolymer is shown in the row of "EA content (mass %)" in Table 1 below.

- EVA1: ethylene-vinyl acetate copolymer (vinyl acetate content 25 mass %; "Evaflex EV360" of DOW-MITSUI POLYCHEMICALS CO., LTD.)
- EVA2: ethylene-vinyl acetate copolymer (vinyl acetate content 14 mass %; "Evaflex P1403" of DOW-MITSUI POLYCHEMICALS CO., LTD.)
- VLDPE1: very-low density polyethylene ("TAFMER DF610" of Mitsui Chemicals, Inc.)
- VLDPE2: very-low density polyethylene ("TAFMER DF810" of Mitsui Chemicals, Inc.)
- EEA1: ethylene-ethyl acrylate copolymer (ethyl acrylate content 25 mass %; "Lexpearl A4250" of Japan Polyethylene Corporation)

EEA2: ethylene-ethyl acrylate copolymer (ethyl acrylate content 20 mass %; "Lexpearl A4200" of Japan Polyethylene Corporation)

EEA3: ethylene-ethyl acrylate copolymer (ethyl acrylate content 15 mass %; "Lexpearl A1150" of Japan Polyethylene Corporation)

EEA4: ethylene-ethyl acrylate copolymer (ethyl acrylate content 7 mass %; "NUC-6220" of ENEOS NUC Corporation)

Evaluation

The multicore cables Nos. 1 to 8 produced above were subjected to measurement of linear expansion coefficient and the elastic modulus, and evaluation of bending durability, wiring workability, and adhesiveness between the inner sheath layer and the outer sheath layer.

[Linear Expansion Coefficient and Elastic Modulus]

The multicore cables of Nos. 1 to 8 had their inner sheath layers subjected to calculation of the linear expansion coefficient C for −30° C. to 25° C. from a dimensional change of a thin plate with respect to variation in temperature pursuant to a method for determining dynamic mechanical properties, as specified in JIS-K7244-4 (1999), using a dynamic viscoelasticity analyzer ("DVA-220" of IT keisoku seigyo K.K.), in a tensile mode in a range in temperature of −100° C. to 200° C. with a temperature increasing rate of 5° C./minute at a frequency of 10 Hz with a strain of 0.05%. Further, the multicore cables had their inner sheath layers subjected to calculation of the elastic modulus E1 at −30° C. and the elastic modulus E2 at 25° C. from a storage modulus measured pursuant to the method for determining dynamic mechanical properties, as specified in JIS-K7244-4 (1999), using the above dynamic viscoelasticity analyzer, in a tensile mode in a range in temperature of −100° C. to 200° C. with a temperature increasing rate of 5° C./minute at a frequency of 10 Hz with a strain of 0.05%. A result thereof is shown in Table 1.

[Bending Durability]

Figure 3:
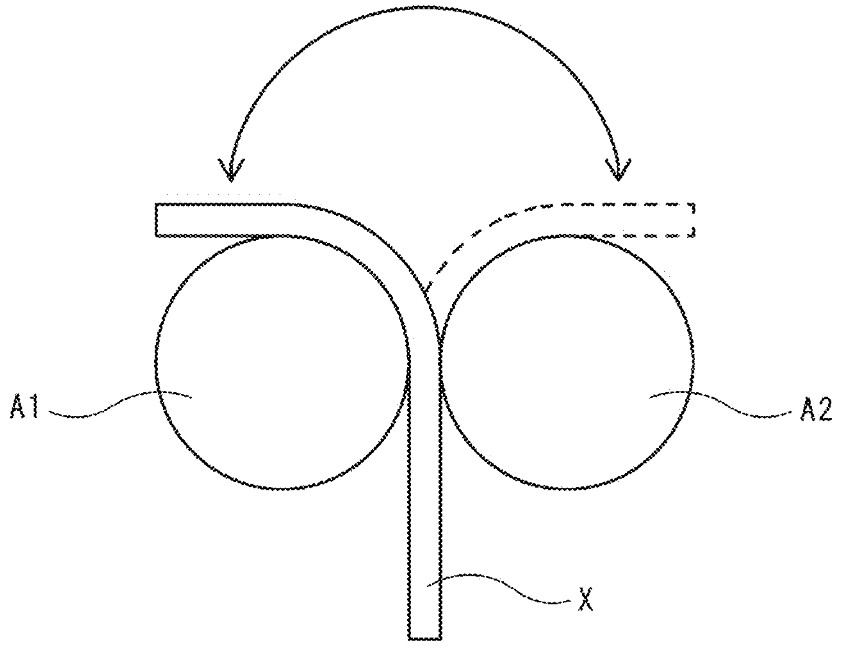
FIG. 3 is a schematic diagram for illustrating a bending test in an example.

As shown in FIG. 3, a multicore cable X of each of Nos. 1 to 8 was passed vertically between two mandrels having a diameter of 60 mm and disposed horizontally and parallel to each other, and had an upper end cyclically bent first by 90° in the horizontal direction so as to abut against an upper side of one mandrel A1, and thereafter by 90° in the opposite direction so as to abut against an upper side of the other mandrel A2. The test conditions were as follows: multicore cable X, with a load of 2 kg applied to its lower end downward, was bent at a temperature of −30° C. at a bending cycle of 60/minute. In this test, the number of times of bending until the multicore cable was disconnected (a state in which the multicore cable could not be energized) was measured. A result thereof is shown in Table 1. Bending durability was evaluated as "good" when the number of times of bending was 20,000 or more, and as "poor" when the number of times of bending was less than 20,000.

[Wiring Workability]

In accordance with IEC60794-1-2 Method 17*c*, a multicore cable was placed between a fixing surface and a plate disposed so as to be parallel to the fixing surface, and bent at 180°, and the end of the multicore cable was fixed by a fixing member. Then, a load cell was placed on the plate, and a load was measured when an external force was applied to the multicore cable until the bending radius became 50 mm, to thereby obtain the bending rigidity ($N \cdot mm^2$). The test was conducted at room temperature. Wiring workability was evaluated as "good" when the bending rigidity was 8,000 $N \cdot mm^2$ or more, and as "poor" when the bending rigidity was less than 8,000$N \cdot mm^2$.

[Adhesiveness Between Inner Sheath Layer and Outer Sheath Layer]

The sheath layer was sampled from the cable and cut into a widthwise 5 mm, and the adhesive strength between the inner sheath layer and the outer sheath layer was determined by performing a T-type peeling test in accordance with JIS-K6854-3 (1999). The adhesive property was evaluated as "good" when the adhesive strength was 7 N/cm or more, and as "poor" when the adhesive strength was less than 7 N/cm.

TABLE 1

| | | No. 1 | No. 2 | No. 3 | No. 4 | No. 5 | No. 6 | No. 7 | No. 8 |
|---|---|---|---|---|---|---|---|---|---|
| Inner Sheath Layer | Resin Component | EVA1 | EVA2 | VLDPE1 | VLDPE2 | EEA1 | EEA2 | EEA3 | EEA4 |
| | EA Content (mass %) | — | — | — | — | 25 | 20 | 15 | 7 |
| | Linear Expansion Coefficient C[$K^{-1}$] (−30° C. to 25° C.) | $1.2 \times 10^{-4}$ | $1.6 \times 10^{-4}$ | $1.2 \times 10^{-4}$ | $1.0 \times 10^{-4}$ | $1.0 \times 10^{-4}$ | $0.8 \times 10^{-4}$ | $1.4 \times 10^{-4}$ | $1.5 \times 10^{-4}$ |
| | Elastic Modulus E1 [MPa] (−30° C.) | 1100 | 1400 | 40 | 250 | 420 | 580 | 870 | 1300 |
| | Elastic Modulus E2 [MPa] (25° C.) | 30 | 110 | 6 | 35 | 31 | 52 | 109 | 170 |
| Evaluation | Number of Times Of Bending [Number of Times] | 10000 | 7000 | 50000 | 30000 | 35000 | 30000 | 20000 | 8000 |
| | Bending Rigidity[$N \cdot mm^2$] | 8900 | 15000 | 6000 | 9000 | 9000 | 9200 | 12000 | 20000 |
| | Adhesive Strength[N/cm] | 10 | 6 | 1 | 1 | 11 | 10 | 7 | 5 |

As shown in Table 1, the multicore cables of No. 5 to No. 7 had good bending durability and good wiring workability.

REFERENCE SIGNS LIST

1 multicore cable
2 core electric wire
2*a* conductor
2*b* insulating layer
3 core wire
4 sheath layer
4*a* inner sheath layer
4*b* outer sheath layer
102 supplying reel
103 stranding unit
104 unit providing inner sheath layer for coating
104*a*, 105*a* reservoir
105 unit providing outer sheath layer for coating
106 cooling unit
107 cable winding reel
A1, A2 mandrel
X multicore cable

The invention claimed is:

1. A multicore cable comprising:

a core wire including a plurality of core electric wires stranded together; and a sheath layer disposed around the core wire, wherein each of the core electric wires includes a conductor including a plurality of elemental wires twisted together and an insulating layer covering an outer periphery of the conductor, wherein the sheath layer includes an inner sheath layer and an outer sheath layer covering the inner sheath layer, wherein a main component of the inner sheath layer is a copolymer of ethylene and (meth)acrylic acid alkyl ester, wherein the (meth)acrylic acid alkyl ester ethyl acrylate, wherein a content of the ethyl acrylate is 10 mass % or more, wherein a main component of the outer sheath layer is polyurethane, wherein a linear expansion coefficient C of the inner sheath layer at −30° C. to 25° C. is 0.8×10^−4 K−1 to 1.5×10^−4 K^−1, wherein an elastic modulus E1 of the inner sheath layer at −30° C. is 400 MPa to 1,300 MPa, and wherein an elastic modulus E2 of the inner sheath layer at 25° C. is 10 MPa to 200 MPa.

2. The multicore cable according to claim 1, being an in-vehicle cable.

3. The multicore cable according to claim 1, wherein an elastic modulus E2 of the inner sheath layer at 25° C. is 30 MPa to 150 MPa.

4. The multicore cable according to claim 1, wherein the linear expansion coefficient C, the elastic modulus E1, and the elastic modulus E2 are values measured pursuant to JIS-K7244-4 (1999) using a dynamic viscoelasticity analyzer in a tensile mode in a temperature range of −100° C. to 200° C., with a temperature increasing rate of 5° C./minute, at a frequency of 10 Hz, and with a strain of 0.05%.

5. The multicore cable according to claim 1, wherein the content of the ethyl acrylate is 15 mass % or more.

6. The multicore cable according to claim 1, wherein the content of the ethyl acrylate is 15 mass % to 25 mass %.

* * * * *